US012475791B2

(12) United States Patent
Simon

(10) Patent No.: US 12,475,791 B2
(45) Date of Patent: Nov. 18, 2025

(54) COLLISION AVOIDANCE METHOD

(71) Applicant: Sfara GmbH, Gießen (DE)

(72) Inventor: Sascha Simon, Rabenau (DE)

(73) Assignee: Sfara GmbH, Gießen (DE)

( * ) Notice: Subject to any disclaimer, the term of this patent is extended or adjusted under 35 U.S.C. 154(b) by 0 days.

(21) Appl. No.: 18/254,480

(22) PCT Filed: Nov. 26, 2021

(86) PCT No.: PCT/EP2021/083081
§ 371 (c)(1),
(2) Date: Sep. 5, 2023

(87) PCT Pub. No.: WO2022/112462
PCT Pub. Date: Jun. 2, 2022

(65) Prior Publication Data

US 2024/0046794 A1 Feb. 8, 2024

(30) Foreign Application Priority Data

Nov. 27, 2020 (DE) ........................ 102020131490.6

(51) Int. Cl.
*G08G 1/16* (2006.01)
*G08G 1/005* (2006.01)

(52) U.S. Cl.
CPC ............. *G08G 1/166* (2013.01); *G08G 1/005* (2013.01); *G08G 1/163* (2013.01)

(58) Field of Classification Search
CPC ........ G08G 1/166; G08G 1/005; G08G 1/163; G08G 1/0112; G08G 1/0129;
(Continued)

(56) References Cited

U.S. PATENT DOCUMENTS

2008/0309468 A1 12/2008 Greene et al.
2020/0086855 A1* 3/2020 Packer ................ G05D 1/0289
2021/0018322 A1 1/2021 Jiang et al.

FOREIGN PATENT DOCUMENTS

DE 102007037610 A1 2/2009
DE 102011010864 A1 12/2011
(Continued)

OTHER PUBLICATIONS

German International Search Report and Written Opinion for German International Aplication No. PCT/EP2021/083081 dated Mar. 14, 2022, 16 pages.
(Continued)

*Primary Examiner* — James J Yang
(74) *Attorney, Agent, or Firm* — Christopher J. Volkmann; KELLY, HOLT & CHRISTENSON PLLC

(57) ABSTRACT

A method for avoiding a collision between at least one first traffic participant and at least one second traffic participant. A first movement profile is assigned to the first traffic participant, wherein a second movement profile is assigned to the second traffic participant, wherein a first probability profile is generated from the first movement profile and a second probability profile is generated from the second movement profile, and the probability profile comprises information relating to the probability of the location of the respective traffic participant at a time in the future, characterized in that a collision probability is determined in a mobile device by superimposing the first probability profile and the second probability profile, wherein the probability profile is determined as a probability cone in space.

20 Claims, 1 Drawing Sheet

(58) Field of Classification Search
CPC .... G08G 1/0133; G08G 1/0145; G08G 1/164; H04W 4/029; G06N 20/00
See application file for complete search history.

(56) References Cited

FOREIGN PATENT DOCUMENTS

| | | | | |
|---|---|---|---|---|
| DE | 10201522751 | A1 | 6/2017 | |
| DE | 102015225751 | A1 * | 6/2017 | ............ G08G 1/166 |
| DE | 102017114876 | A1 | 1/2019 | |
| DE | 102018128398 | B3 | 12/2019 | |
| DE | 102018117561 | A1 | 1/2020 | |
| WO | 2020160748 | A1 | 8/2020 | |

OTHER PUBLICATIONS

Second German Office Action for Application No. 102020131490.6, dated Mar. 13, 2024, 8 pages.
Non-Final Office Action for U.S. Appl. No. 18/254,463, dated Jul. 24, 2025, 11 Pages.
Examination Report for German Application No. 102020131489.2, dated Mar. 26, 2021, 9 Pages.
International Preliminary Report on Patentability for International Application No. PCT/EP2021/083080, dated Feb. 20, 2023, 17 Pages.
International Search Report and Written Opinion for International Application No. PCT/EP2021/083080, dated Mar. 16, 2022, 17 Pages.
International Preliminary Report on Patentability for International Application No. PCT/EP2021/083081, dated Feb. 20, 2023, 17 pages.
Communication Pursuant to Article 94(3) for European Application No. 21820529.2, dated Jul. 22, 2025, 26 Pages.
Communication Pursuant to Article 94(3) for European Application No. 21820530.0, dated Jul. 22, 2025, 23 Pages.

* cited by examiner

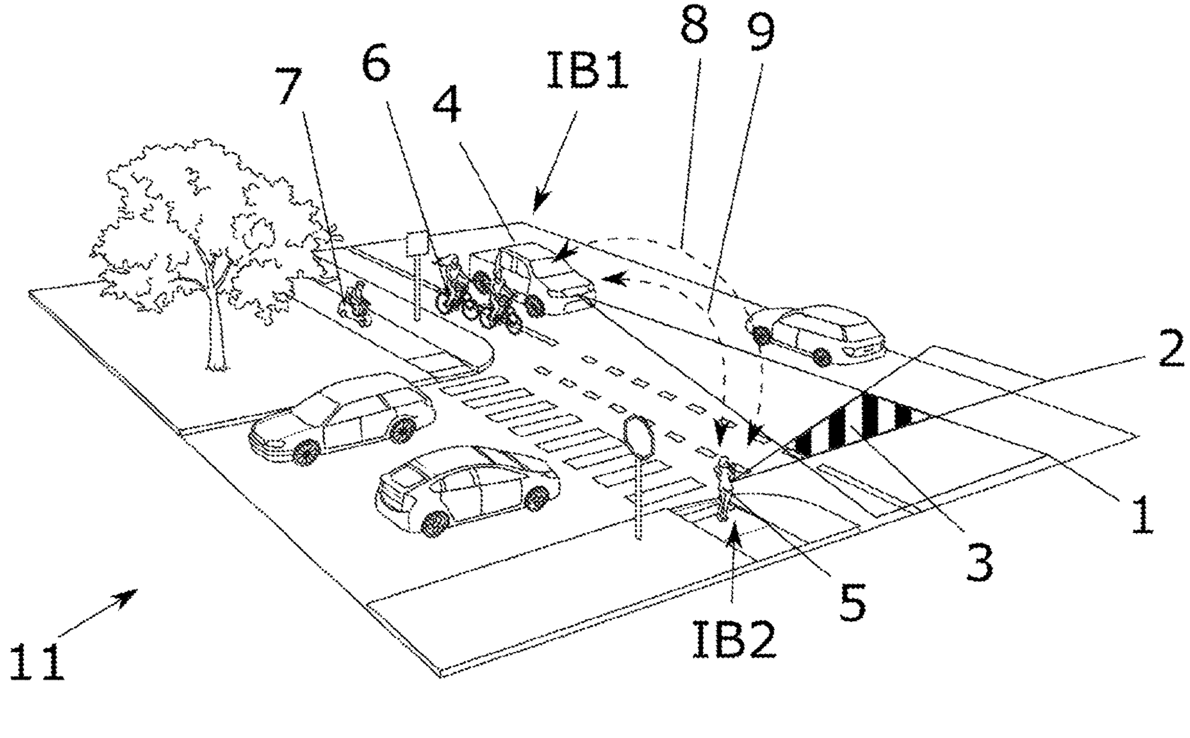
7
6
4
IB1
8
9
2
1
3
5
IB2
11

COLLISION AVOIDANCE METHOD

FIELD OF THE DISCLOSURE

The present disclosure relates to a method for avoiding a collision according to the preamble of patent claim 1.

BRIEF DESCRIPTION OF THE DRAWINGS

Further details of the present disclosure are described on the basis of schematically illustrated exemplary embodiments in the drawing, in which:

FIG. 1 shows a schematic illustration of typical traffic events.

DETAILED DESCRIPTION

Avoiding collisions between traffic participants in daily traffic events is a problem for which different approaches have already been developed in order to manage it.

The use of LIDAR (light detection and ranging), in addition to the alternative method RADAR (radio detection and ranging), makes it possible to carry out distance and speed measurements between traffic participants using LASER radiation. In contrast to RADAR, influences which have a negative effect on a measurement, for example on account of aerosols or the water content of the air, can be minimized in LIDAR, depending on the wavelength of the light used. Each traffic participant equipped with such a system may be able, through the use of said system, to determine their location and their movement in relation to other traffic participants.

The disadvantage of this is that a sometimes quickly changing behavior of the traffic participants cannot be predicted owing to a lack of communication and exchange of information with one another. A prediction of the traffic events, which is needed to avoid collisions, is impossible here.

On the basis of this, it is obvious to network the traffic participants: This can be enabled using common radio technologies.

On the one hand, local solutions limited to a location of the traffic events, for example by means of short-range radio technologies, have the disadvantage of transmission that is susceptible to interference and is unreliable, which is a dangerous situation for such safety aspects. In addition, there is a need for central routing of the data.

On the other hand, decentralized and long-range mobile radio solutions have the disadvantage that the data must be transmitted to a server far away from the traffic events and this results in unacceptable latencies when assessing the status quo of the traffic events.

In aviation, systems such as the TCAS (Traffic Alert and Collision Avoidance System), in which a corresponding transponder of other traffic participants, for example aircraft, in the surrounding air space is interrogated and an overview of the situation as regards the safety provided for the respective traffic participant is therefore determined, have become prevalent. Depending on the data from a possible collision opponent, the TCAS outputs a traffic advisory or an avoidance alert. This is carried out on the basis of the calculation of the point of closest approach, the period of time until this point is reached and the check with respect to the presence of any distance violation.

The disadvantage of this is that each traffic participant must carry such a TCAS and a corresponding transponder in order to ensure the required safety and to be able to assess the hazardous situation.

The object of the present disclosure is therefore to develop a simple and cost-effective possible way of increasing traffic safety in the sense of avoiding collisions.

This object is achieved, according to the present disclosure, by the characterizing features of patent claim 1 in conjunction with the preamble of patent claim 1.

In the sense of the present disclosure, the type of movement comprises information relating to the means of transport used by a traffic participant and the associated characteristic movement variables.

In the sense of the present disclosure, characteristic movement variables are understood as meaning, for example, the speed, the (radial) acceleration or the like.

In the sense of the present disclosure, the type of movement can be used to distinguish, for example, cyclists from pedelec riders, from motor vehicle drivers, from motorcyclists, from pedestrians or from users of public means of transport. A distinction from self-guided movement means or autonomously moving means of transport is also provided.

Furthermore, in the sense of the present disclosure, preset parameters of the type of movement are understood as meaning, for example, the distinction as to whether an adult traffic participant, a child or a traffic participant with special characteristics is involved, or whether another preference and/or restriction should be taken into account.

Furthermore, in the sense of the present disclosure, measurable environmental variables are understood as meaning, for example, connections to vehicles via communication interfaces, for example wireless network connections or Bluetooth, position data, for example GPS (Global Positioning System), or positioning at transmission masts, movement trajectories or the like.

Furthermore, in the sense of the present disclosure, communication networks are understood as meaning networks for mobile radio communication and mobile data networks, for example the 3G, 4G, 5G mobile radio standards or the like.

Furthermore, the term "traffic" in the sense of the present disclosure comprises general road traffic, for example.

The present disclosure relates to a method for avoiding a collision between at least one first traffic participant and at least one second traffic participant, wherein a first movement profile is assigned to the first traffic participant, wherein a second movement profile is assigned to the second traffic participant, wherein a first probability profile is generated from the first movement profile and a second probability profile is generated from the second movement profile, and the probability profile comprises information relating to the probability of the location of the respective traffic participant at a time in the future, wherein a collision probability is determined in a mobile device by superimposing the first probability profile and the second probability profile.

It is advantageously possible to generate knowledge relating to a possible collision in the future on the basis of data relating to all traffic participants which can be easily determined. It is possible to consider all the traffic events, which can be considered to be necessary to the effect that the individual traffic participants are in constant exchange with one another and alternately influence one another by virtue of their behavior. The knowledge of an imminent collision is fundamental for avoiding such a collision and it is possible to avert material damage and protect human life in an improved form. As a result of the fact that the collision probability is determined in a mobile device, it is possible to quickly process the data, for example in the traffic participant's closest environment.

It is also advantageous in this case that it is possible to determine the collision probability locally at the traffic participant themselves and to thereby dispense with additional infrastructure for calculating the probabilities.

It is advantageous in this case that devices suitable for the method, for example cellphones or smartphones, are carried by many people and can be used to calculate the collision probabilities. Furthermore, it may be possible for the data relating to the respective traffic participant to remain in the traffic participant's own area of influence and for the traffic participant to be able to effortlessly have said data.

Provision is also made for probable matches of the location of the first traffic participant and of the second traffic participant at a common time in the future to be determined.

In the light of a consideration of the need for the location and time to match as a prerequisite for a possible collision, it proves to be advantageous in this case that predictions of a possible collision can also be determined for a common time of the traffic participants involved. An improvement in avoiding a collision is therefore achieved.

Provision is also made for the movement profile to comprise information relating to the type of movement of the traffic participant, in particular relating to the means of transport used.

The knowledge of the type of movement and the means of transport used advantageously makes it possible to be able to better assess a collision probability. For example, the inertia of a traffic participant in question, for example on account of the mass of the transport means used, has a decisive influence on the possibility of a collision.

The options for a traffic participant of being able to react to a possible collision are also dependent on the type of movement. Distinctions between the use of autonomously moving means of transport and the use of a wheelchair, for example, can be explicitly taken into account hereby.

Furthermore, this might advantageously enable a more accurate assessment of the hazardous situation in order to avoid collisions, which could be assessed differently in the case of a pedestrian-pedestrian collision than in the case of a pedestrian-motor vehicle collision, for example.

Provision is also made for the type of movement of the traffic participant to be determined from characteristic movement variables and/or measurable environmental variables and/or capabilities of the traffic participant, wherein the determination is preferably carried out in a mobile device, in particular a smartphone or the like, carried by the traffic participant and/or is partially defined by preset parameters.

The advantage of this is that it is possible to dispense with an active data input by the traffic participant and it is possible to easily detect, for example by means of the mobile device carried by the traffic participant, whether a change of the means of transport has taken place, for instance. Characteristic movement variables, for example the speed or the acceleration, and/or measurable environmental variables and/or capabilities of the traffic participant may therefore be detected by means of the mobile device and may be used to better determine the movement profile by means of preset parameters, for example the age of the traffic participant or the like.

Provision is also made for the movement profile to be determined in a mobile device, in particular a smartphone or the like, carried by the traffic participant, in particular to be determined from empirical values and/or sensor data.

The advantage of this is therefore the possibility of using a device which is already carried by many traffic participants. This makes it possible to achieve a broader penetration of the traffic events, which can have a positive effect on the determination and therefore the quality of the movement profile.

The uncertainty with respect to the movement profile valid for the respective situation can be reduced promptly by means of determined sensor data and by means of empirical values. Empirical values may reflect, for example, redundancies in the routes covered by the traffic participants. These may be given by the daily route to the place of work, for example, and may be detected thereby and may improve the determination of the movement profile.

Provision is also made for the probability profile to be determined in a mobile device, in particular a smartphone or the like, carried by the traffic participant, in particular to be determined from the movement profile and/or a type of movement, preferably the type of movement as claimed in claim 4 or 5.

This advantageously makes it possible to also use the advantages of the device already carried by many traffic participants for the probability profile. The above-mentioned advantages with regard to improved determination of the movement profile can therefore also be included in improved determination of the probability profile.

Provision is also made for the probability profile to be determined as a probability funnel in the plane, in particular as a probability cone in space.

The advantage of this is that a visually catchy form of presentation can be selected thereby, as a result of which the probability profile of the traffic participants can be presented in the plane and/or in space.

Provision is also made for the probability profile to be transmitted to at least one computing unit, preferably to be transmitted via a communication network, and for the computing unit to superimpose at least the first probability profile of the first traffic participant with the second probability profile of the second traffic participant in order to determine the collision probability.

The advantage of this is that the collision probability can be determined quickly and promptly by using the computing unit. In addition, this can take place during a transmission via a communication network over a certain distance and resources available outside the mobile device can be used for this purpose.

Provision is also made for the computing unit to capture only a restricted geographical area, for example an intersection region of a road intersection, and the traffic participants located there and to determine the collision probability for them.

The advantage of this is that the available resources of the computing unit can be saved and can be used in a manner focused on appropriate areas. This makes it possible to determine the collision probability in a faster and more precise manner. It can be assumed that an intersection region of an urban road intersection entails a higher risk of a collision between traffic participants than an intersection-free highway. Capturing specific high-risk areas allows resources to be saved elsewhere.

Provision is also made for the collision probability to be determined within a maximum of 100 ms after transmitting the probability profiles, wherein the determination is carried out by at least one computer unit, in particular the computer unit in a method as claimed in claim 8, 9 or 10.

From the point of view that time is a serious factor for avoiding collisions, it is advantageous in this case to enable the determination within 100 ms. This makes it possible to save valuable time which is needed at another location to avoid a possible collision.

When there is a possible collision probability, provision is also made for a visual and/or aural and/or haptic warning, in particular a visual and/or aural and/or haptic recommended action, to be communicated to the traffic participant.

The advantage of this is that the traffic participant involved in a possible collision is given possible ways of being able to react adequately to an imminent collision.

Provision is also made for the collision probability to be deter mined in real time, in particular in a prioritized manner on the computer unit, after transmitting the probability profiles.

The advantage of this is that the calculations can therefore be carried out without disruption and reliably and in a manner unhindered by other processes executed on the computer unit.

Provision is also made for collision probabilities and/or movement profiles and/or types of movement and/or probability profiles to be stored in a memory completely or at least proportionately, preferably to be stored in a manner linked to a temporal or profile-based validity component.

The advantage of this is that it is possible to resort to stored data and there is no need to resort to data to be newly measured, which can contribute to shortening the calculation times. Furthermore, the validity component can be used to ensure that the data are regenerated after a certain time and changing conditions can thereby be taken into account.

Provision is also made for collision probabilities and/or movement profiles and/or types of movement and/or probability profiles from earlier performances of the method to be included as learning parameters in the determination of the collision probability.

The advantage of this is that the method can improve its determinations and can provide more accurate results, for example with the aid of artificial intelligence, by means of learning effects. This can be used to constantly improve the method by carrying out the method.

Provision is also made for machine learning, in particular deep learning, to be used to determine the movement profiles.

The advantage of this is that experience from the movement profiles which have already been created can be included in the determination of the movement profiles yet to be created and an improved prediction for avoiding a collision can therefore be created.

Provision is also made for the probability profiles to be compared in a decentralized manner in the mobile device of the traffic participants, in particular of the traffic participant.

The advantage of this is that aspects of data protection can be taken into account since the data are used and processed exclusively in the area of influence of the traffic participant. The use of external infrastructure can therefore be prevented or at least minimized.

Provision is also made for e probability profiles to be transmitted by means of the mobile devices.

This may make it possible to be able to dispense with additional devices for transmission and for the traffic participant to be able to effortlessly have their data and for a possible way of dispensing with external infrastructure to be provided.

In other words, the present disclosure discloses a method which enables a continuous prediction of the movement of traffic participants over the next seconds in each case and reveals the transport means in which the traffic participants are located. In combination with mobile radio networks, communication interfaces, for example wireless network connections or Bluetooth, position data, for example GPS (Global Positioning System), or positioning at transmission masts, and movement trajectories, the method makes it possible to warn all involved traffic participants having a mobile device, for example a smartphone, of a potential accident.

FIG. 1 shows, by way of example, a schematic illustration of typical road events. A first traffic participant IB1 is assigned a first movement profile by means of a mobile device (not illustrated), for example a smartphone, carried by the participant, and a second traffic participant IB2 is similarly assigned a second movement profile. A first probability profile is generated from the first movement profile and a second probability profile is generated from the second movement profile.

The first probability profile for the first traffic participant IB1 is illustrated as a first probability funnel 1 in the plane and the second probability profile for the second traffic participant IB2 is illustrated as a second probability funnel 2 in the plane.

A collision probability is determined in the mobile device, which is carried by the respective traffic participant, by superimposing the first probability profile and the second probability profile. This is clearly illustrated, by way of example, as an intersection 3 of the first probability funnel 1 and the second probability funnel 2. The respective probability profiles comprise information relating to the probability of the location of the respective traffic participant at a time in the future.

The probability profiles are superimposed in a computing unit which is located in the mobile device of the respective other traffic participant and to which the probability profiles are transmitted. The first transmission 8 of the first probability profile preferably takes place via a communication network or a wireless network connection or Bluetooth. The second transmission 9 of the second probability profile takes place in the same way. In other words, the traffic participants exchange their probability profiles with one another, whereupon the computing unit of the respective traffic participant determines a collision probability of the respective traffic participant. According to the respective collision probability, a warning, for example, is communicated to the corresponding traffic participant.

It is also illustrated, by way of example, that the traffic participant IB1 drives a motor vehicle 4 and the traffic participant 2 is a pedestrian 5 in the traffic situation. Provision is likewise made for the type of movement to be identified, for example, as the use of a bicycle 6, a wheelchair 7 or the like, as illustrated in FIG. 1. The movement profile of the respective traffic participant comprises information relating to the respective type of movement of the traffic participant. This information as well as characteristic movement variables and/or measurable environmental variables are detected by means of the mobile device (not illustrated) of the respective traffic participant IB1, IB2 that is carried by the latter.

In FIG. 1, the computing unit is in the region of a transmission mast 10 which captures only a restricted geographical area, such as the intersection region of a road intersection 11 illustrated here, and the traffic participants IB1, IB2 located there.

After determining the collision probability within 100 ms, a warning is communicated to the respective traffic participants according to this probability.

LIST OF REFERENCE SIGNS

IB1 First traffic participant
IB2 Second traffic participant

1 First probability funnel
2 Second probability funnel
3 Intersection
4 Motor vehicle
5 Pedestrian
6 Bicycle
7 Wheelchair
8 Transmission of a first probability profile
9 Transmission of a second probability profile
10 Transmission mast
11 Intersection region of a road intersection

The invention claimed is:

1. A method for avoiding a collision between a first traffic participant and a second traffic participant, wherein a first movement profile is assigned to the first traffic participant, and wherein a second movement profile is assigned to the second traffic participant, the method comprising:
obtaining a first probability cone in a space comprising at least two geographical dimensions, wherein the first probability cone is based on the first movement profile and represents a probability of a location, in the space comprising at least two geographical dimensions, of the first traffic participant at one or more times in the future;
obtaining a second probability cone in the space comprising at least two geographical dimensions, wherein the second probability cone is based on the second movement profile and represents a probability of a location, in the space comprising at least two geographical dimensions, of the second traffic participant at one or more times in the future;
superimposing, by a mobile device, the first probability cone and the second probability cone in the space comprising at least two geographical dimensions; and
determining, by the mobile device, a collision probability based on the superimposing the first probability cone and the second probability cone.

2. The method as claimed in claim 1, wherein determining the collision probability comprises:
determining one or more probable matches of the location of the first traffic participant and the location of the second traffic participant at a common time in the future.

3. The method as claimed in claim 1, wherein
the first movement profile comprises information relating to a type of movement of the first traffic participant, and
the second movement profile comprises information relating to a type of movement of the second traffic participant.

4. The method as claimed in claim 3, and further comprising determining the type of movement of the respective traffic participant from characteristic movement variables and/or measurable environmental variables and/or capabilities of the respective traffic participant.

5. The method as claimed in claim 1, wherein
the mobile device comprises a first mobile device carried by the first traffic participant,
the first movement profile is determined in the first mobile device from empirical values and/or sensor data, and
the second movement profile is determined in a second mobile device carried by the second traffic participant from empirical values and/or sensor data.

6. The method as claimed in claim 1, wherein
obtaining the first probability cone comprises generating by the mobile device, the first probability cone based on the first movement profile and/or a type of movement, and
obtaining the second probability cone comprises receiving, by the mobile device, the second probability cone via a transmission from a computing device.

7. The method as claimed in claim 6, wherein the computing device comprises a second mobile device associated with the second traffic participant.

8. The method as claimed in claim 6, wherein the computing device is formed in a region of a transmission mast and/or a network node.

9. The method as claimed in claim 1, wherein the collision probability is determined by the mobile device within a maximum of 100 milliseconds (ms) after obtaining the first probability cone and obtaining the second probability cone.

10. The method as claimed in claim 9, and further comprising:
providing an indication of the collision probability to the first traffic participant within a maximum of 100 milliseconds (ms) after obtaining the first probability cone and obtaining the second probability cone.

11. The method as claimed in claim 1, and further comprising:
in response to determining a possible collision probability, communicating a visual and/or aural and/or haptic warning to at least one traffic participant of the first traffic participant and the second traffic participant.

12. The method as claimed in claim 6, wherein the collision probability is determined in real time, in a prioritized manner on the mobile device, after generating the first probability cone and receiving the second probability cone.

13. The method as claimed in claim 1, wherein collision probabilities and/or movement profiles and/or types of movement and/or probability profiles are stored in a memory completely or at least proportionately.

14. The method as claimed in claim 3, wherein the method is iteratively performed and further comprises:
obtaining one or more learning parameters based on at least one of the collision probability, the first movement profile, the second movement profile, the type of movement, the first probability cone, or the second probability cone from a first performance of the method and using the one or more learning parameters to determine the collision probability in a second performance of the method.

15. The method as claimed in claim 1, and further comprising using deep learning to obtain at least one of the first movement profile or the second movement profile.

16. The method as claimed in claim 6, wherein the computing device comprises a required computing power executed at a defined edge of a communication network.

17. The method as claimed in claim 1, wherein determining the collision probability comprises:
identifying a geographic area, in the space comprising at least two geographical dimensions, in which the first probability cone intersects the second probability cone.

18. A mobile computing device comprising:
a position sensor configured to generate position sensor data representing a geographic position of the mobile computing device,
wherein the mobile computing device is configured to:
generate a first probability cone in a space comprising at least two geographical dimensions, wherein the first probability cone is based on the position sensor data and a first movement profile corresponding to a first traffic participant, the first probability cone representing a probability of a location, in the space comprising at least two geographical dimensions, of the first traffic participant at one or more times in the future;

receive a second probability cone in the space comprising at least two geographical dimensions, wherein the second probability cone is based on the second movement profile corresponding to a second traffic participant and represents a probability of a location, in the space comprising at least two geographical dimensions, of the second traffic participant at one or more times in the future;

superimpose the first probability cone and the second probability cone in the space comprising at least two geographical dimensions; and determine a collision probability based on the superimposing the first probability cone and the second probability cone.

19. The mobile computing device as claimed in claim 18, wherein the second probability cone is received from another mobile computing device of the second traffic participant.

20. The mobile computing device as claimed in claim 18, wherein the second probability cone is received from a computing device at a defined edge of a communication network.

* * * * *